United States Patent
Roy et al.

(10) Patent No.: US 12,212,166 B2
(45) Date of Patent: Jan. 28, 2025

(54) METHOD FOR CONTROLLING A BATTERY ALLOWING CONTROL OF A HOMOGENOUS CURRENT TO THE CELLS OF A POWER LINE

(71) Applicants: PSA AUTOMOBILES SA, Poissy (FR); CENTRE NATIONAL DE LA RECHERCHE SCIENTIFIQUE, Paris (FR); CONSERVATOIRE NATIONAL DES ARTS ET METIERS, Paris (FR); SAFT, Levallois Perret (FR); ÉCOLE NORMALE SUPÉRIEURE PARIS-SACLAY, Cachan (FR)

(72) Inventors: Francis Roy, Les Ulis (FR); Adrien Dittrick, Allauch (FR); Bertrand Revol, Fresnes (FR); Denis Labrousse, Cachan (FR); Thomas Peuchant, Le Bouscat (FR)

(73) Assignees: PSA AUTOMOBILES SA, Poissy (FR); CENTRE NATIONAL DE LA RECHERCHE SCIENTIFQUE, Paris (FR); CONSERVATOIRE NATIONAL DES ARTS ET METIERS, Paris (FR); SAFT, Levallois (FR); ÉCOLE NORMALE SUPÉRIEURE PARIS-SACLAY, Cachan (FR)

( * ) Notice: Subject to any disclaimer, the term of this patent is extended or adjusted under 35 U.S.C. 154(b) by 511 days.

(21) Appl. No.: 17/638,046

(22) PCT Filed: Jul. 23, 2020

(86) PCT No.: PCT/FR2020/051350
§ 371 (c)(1),
(2) Date: Feb. 24, 2022

(87) PCT Pub. No.: WO2021/048477
PCT Pub. Date: Mar. 18, 2021

(65) Prior Publication Data
US 2022/0285952 A1    Sep. 8, 2022

(30) Foreign Application Priority Data
Sep. 9, 2019    (FR) .................................. 1909868

(51) Int. Cl.
*H02J 7/00*      (2006.01)
*H01M 10/0525*   (2010.01)
(Continued)

(52) U.S. Cl.
CPC ....... *H02J 7/0019* (2013.01); *H01M 10/0525* (2013.01); *H01M 10/4257* (2013.01);
(Continued)

(58) Field of Classification Search
USPC ......................................................... 320/117
See application file for complete search history.

(56) References Cited

U.S. PATENT DOCUMENTS

| 10,236,538 B2 * | 3/2019 | Chen .................. H01M 10/441 |
| 2014/0035361 A1 | 2/2014 | Schmidt et al. |

(Continued)

FOREIGN PATENT DOCUMENTS

| DE | 102014215845 A1 | 2/2016 |
| WO | 2012117110 A2   | 9/2012 |

(Continued)

OTHER PUBLICATIONS

International Search Report for PCT/FR2020/051350 mailed Sep. 1, 2020.
Written Opinion for PCT/FR2020/051350 mailed Sep. 1, 2020.

*Primary Examiner* — Samuel Berhanu
(74) *Attorney, Agent, or Firm* — Sandberg Phoenix & von Gontard, PC

(57) ABSTRACT

The present invention relates to a method for controlling a battery with integrated inverters comprising n basic cell modules (MEk) which supply a basic voltage Vcell and allow the application of a homogenous current to all the cells. More specifically, the method comprises a step of controlling the control signals (uik) from the basic modules (MEk) so as to provide the voltage waveform (VM1) on the (Continued)

basis of a selection of a group of q basic modules (MEk) according to a reference voltage setpoint Vref, where Vref=qVcell, determining a classification of the n basic modules, processing the classification of the plurality n according to a circular permutation of the positions of the basic modules (MEk) such that each basic module (MEk) of the plurality n is involved in producing the voltage waveform over a period that is the same for each module. The invention is applicable in the fields of electromobility and stationary energy storage.

10 Claims, 5 Drawing Sheets

(51) Int. Cl.
*H01M 10/42* (2006.01)
*H01M 10/44* (2006.01)

(52) U.S. Cl.
CPC ......... *H01M 10/441* (2013.01); *H02J 7/0016* (2013.01); *H01M 2010/4271* (2013.01)

(56) References Cited

U.S. PATENT DOCUMENTS

| | | | |
|---|---|---|---|
| 2019/0103750 A1 | 4/2019 | Kristensen | |
| 2019/0229540 A1* | 7/2019 | Lee | H02J 7/0024 |

FOREIGN PATENT DOCUMENTS

| | | |
|---|---|---|
| WO | 2014057192 A2 | 4/2014 |
| WO | 2014145756 A1 | 9/2014 |
| WO | 2018130020 A1 | 7/2018 |
| WO | 2018154206 A1 | 8/2018 |
| WO | 2018193173 A1 | 10/2018 |

* cited by examiner

[Fig. 1]
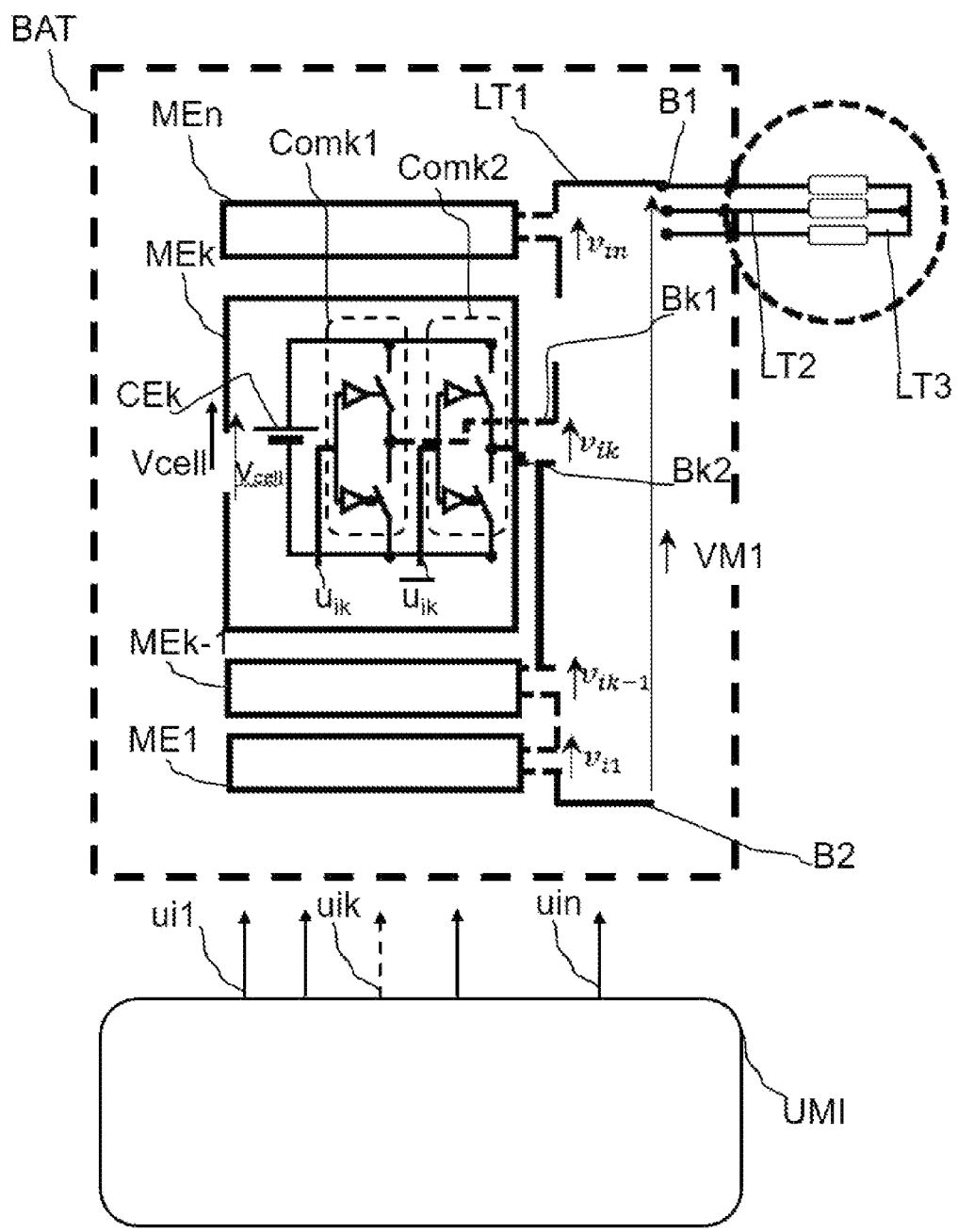

[Fig. 2]
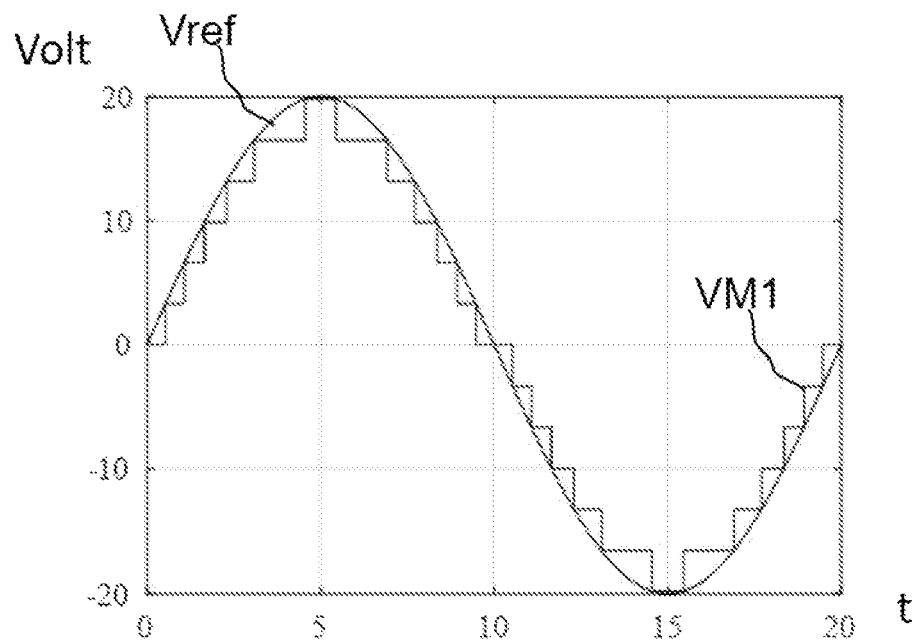
[Fig. 3]
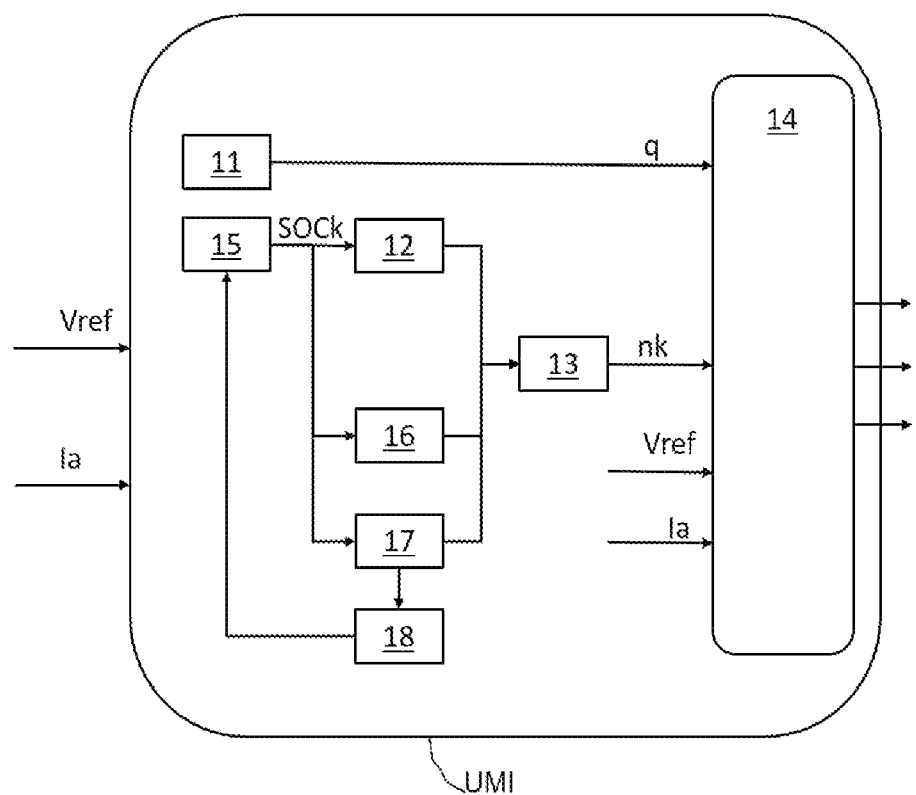

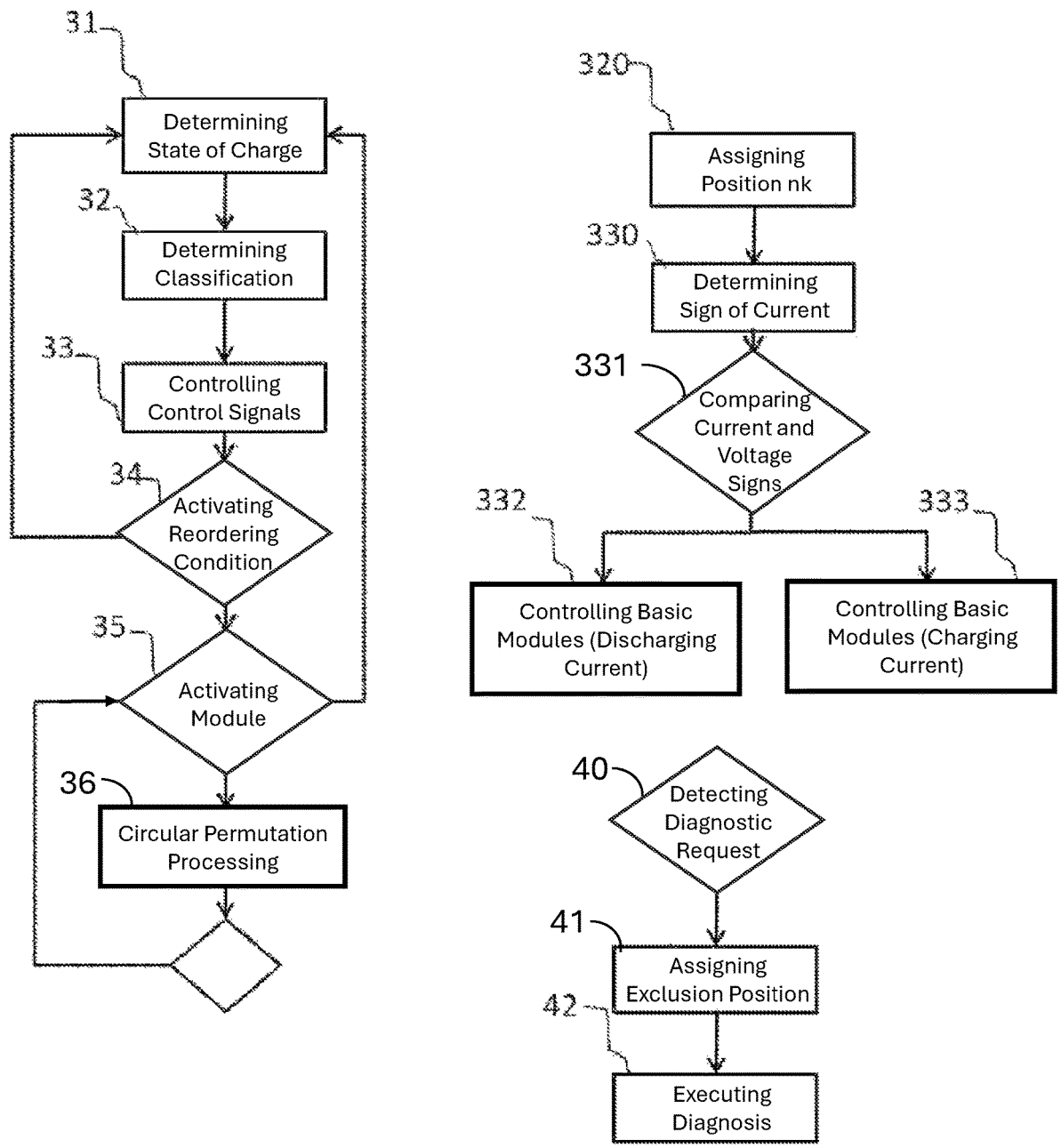
[Fig. 4]

[Fig. 5]
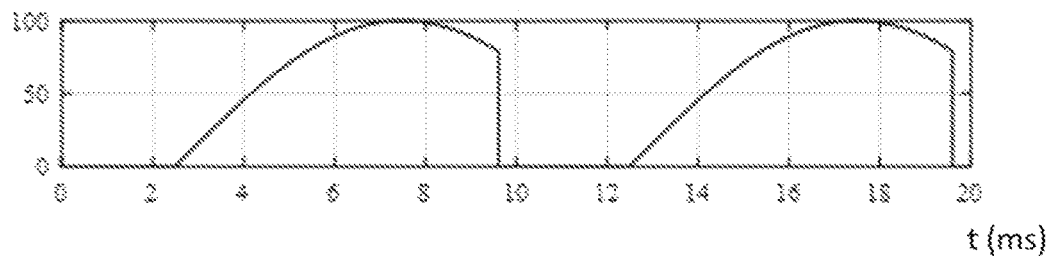
[Fig. 6]
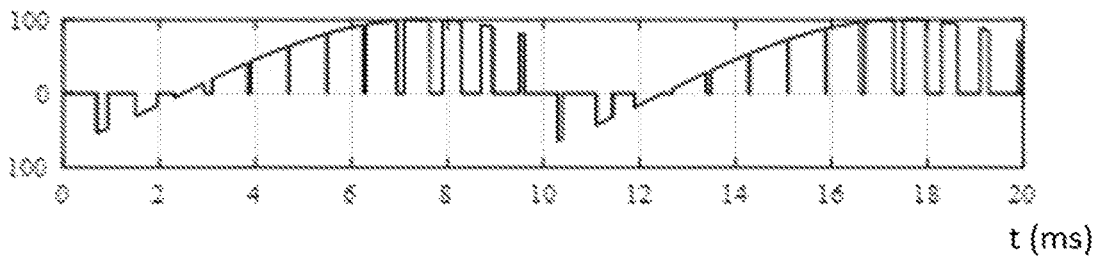
[Fig. 7]
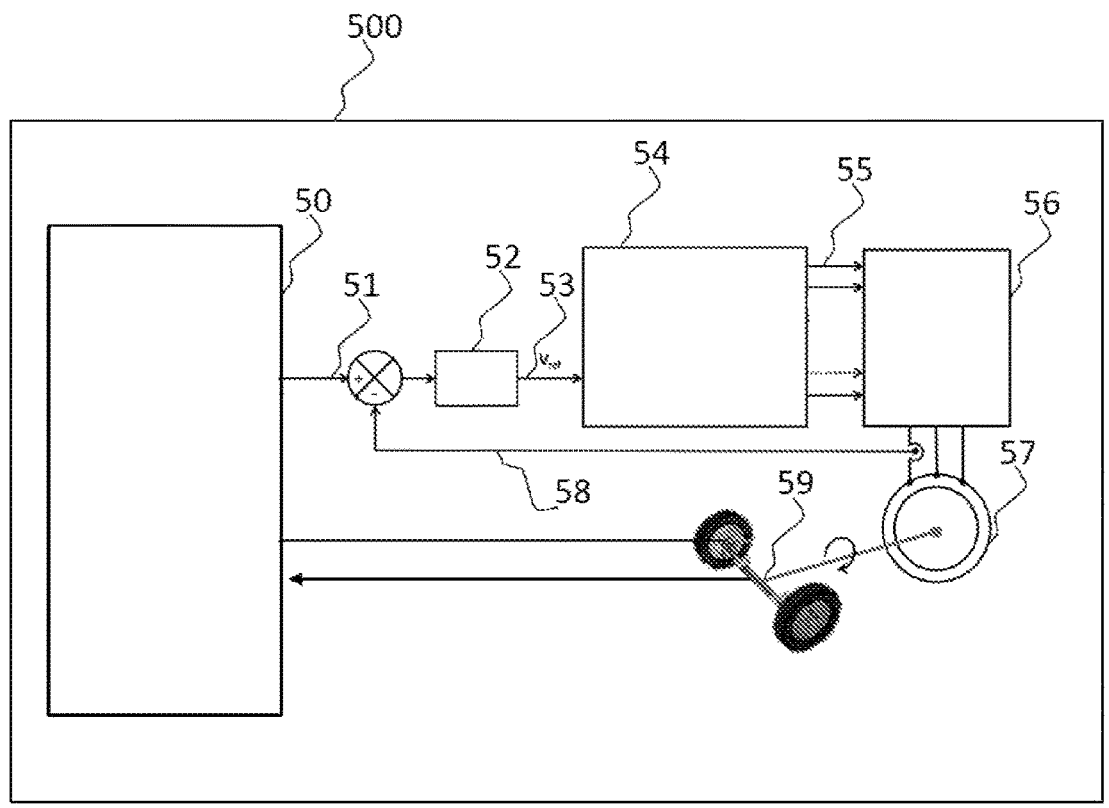

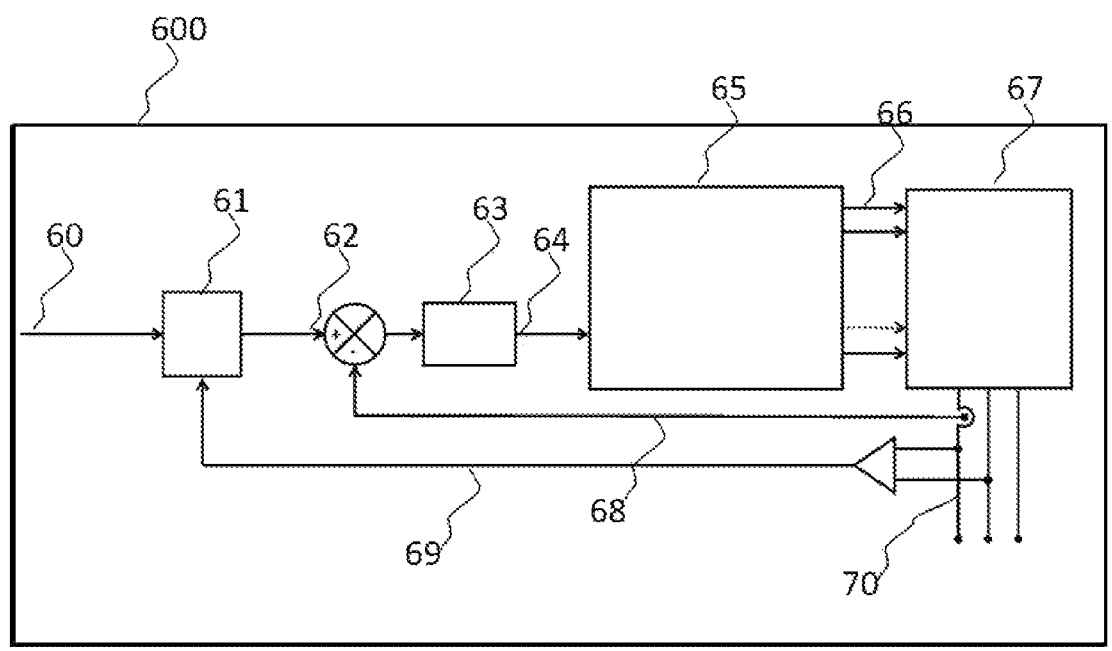
[Fig. 8]

METHOD FOR CONTROLLING A BATTERY ALLOWING CONTROL OF A HOMOGENOUS CURRENT TO THE CELLS OF A POWER LINE

CROSS-REFERENCE TO RELATED APPLICATIONS

This application is the US National Stage under 35 USC § 371 of International Application No. PCT/FR2020/051350, filed 18 Mar. 2020 which claims the priority of French application 1909868 filed on 9 Sep. 2019, the content (text, drawings and claims) of both being incorporated herein by way of reference.

BACKGROUND

The invention relates to a method for controlling an electrochemical battery which allows the state of charge of electric cells for electromobility and stationary energy storage applications to be balanced. The invention is applicable, but not exclusively applicable, to Lithium-ion (Li-ion) batteries.

Nowadays, electrochemical cells involving Lithium-ion technology are particularly suitable for electric traction powertrains due to the fact that they have a beneficial energy density to cost per kWh ratio. As is known, the energy cells forming the batteries have different self-discharging rates resulting in a natural difference between them. This is a slow phenomenon, which over time, if not compensated for, can limit the useable capacity of the battery. In order to correct this phenomenon, it is known to implement a balancing mechanism that involves aligning all the cells of the battery on the same state of charge level. However, when the cells are connected in series in order to increase the battery voltage, the same charging or discharging current passes through all the cells, which does not allow the state of charge of each cell to be adjusted individually.

For these architectural cases, a person skilled in the art is aware of specific balancing mechanisms. A first technique, called passive balancing, involves discharging the most charged cells by temporarily connecting resistors to their terminals. This technique has several shortcomings. It causes a loss of energy on board the battery by heat dissipation in the balancing resistors. The balancing currents that are generally limited to low values (a few tens or even hundreds of milliamperes) to avoid excessive heating of the resistors therefore increase the balancing time when the battery is highly imbalanced. A second technique, called active balancing, involves transferring the energy from the most charged cells to the least charged cells by controlling charge transfer currents between the cells. These balancing currents have values that are slightly higher than the passive solution and are approximately a few amperes. The advantage of this technique is that it aims to conserve energy; however, its cost is much higher than the passive balancing technique due to the fact that it requires dedicated power electronics (transformers, buffer capacitors) to implement the energy transfer. Moreover, its implementation nevertheless involves significant transfer losses due to an energy efficiency level of approximately 50% to 80%. Since passive systems are significantly less expensive, automobile manufacturers generally opt for such systems.

In a conventional battery module, also called "pack," all the cells are connected in series and in parallel in order to form a high voltage battery. This battery module is electrically connected to an external converter of the inverter type in order to deliver the desired voltage to the electric traction machine.

WO2012117110A2 and WO2014145756A1 describe architectures of integrated power control battery modules comprising modules of cells electrically connected in series and in parallel and describe battery management strategies allowing the cells to be balanced during the charging and discharging phase.

Furthermore, the Applicant of the present application also filed international patent applications, published as WO2018193173A1 and WO2018154206A1, relating to an alternative battery architecture where the innovation involves proposing an integrated inverter control architecture within the high voltage battery module itself and in which each electric cell, having a nominal basic voltage of between 2V and 4V at its terminals (approximately 2.2V or 3.3V to 3.7V depending on the selected technology, for example, NMC/LTO or NMC/Graphite), is associated with an individual power structure allowing the cell to be individually controlled in order to provide a line output voltage generated in amplitude stages equal to the basic voltage. The control principle of this battery architecture involves always connecting cells, from among a plurality of n cells in total, in series to the current line q, where q is the ratio between the reference voltage setpoint and the basic voltage of a cell.

This architecture has many advantages that are cited hereafter in a non-exhaustive manner. It is promising in terms of performance and autonomy and allows direct connection of the battery module with a single-phase and three-phase network without needing an external inverter. It allows the cells to be connected or bypassed (i.e. disconnected and shunted) individually so as to disconnect a faulty cell where necessary, without necessarily replacing an entire battery module. The integrated control structure allows full-wave control, which causes less degradations in the windings of an electric machine, reduces common mode currents and eliminates the leakage currents that are generally present in the conventional architectures. In the case of a motor vehicle, this architecture allows degraded operation without immobilizing the vehicle and improves the recycling or the second life management of the cells due to the fact that it is possible to know the state of health of each cell. In a stationary energy storage application, a faulty cell can be replaced without necessarily stopping the operation of the station.

However, depending on the requested reference voltages, some cells of the system can be isolated for varying lengths of time. Therefore, this architecture tends to naturally imbalance the cells. Moreover, some situations in the life of motor vehicles require a low voltage level and a high current demand at the same time, such as, for example, going uphill. A large part of the cells is therefore bypassed when producing the reference voltage. The cells can quickly become imbalanced over a short duration.

SUMMARY

One object is to improve this latter battery architecture proposed by the Applicant. More specifically, the object is to prevent an imbalance in the cells when generating a line voltage and, more specifically, a control method ensuring homogeneous charging and discharging of the cells. The method improves the control of the battery in order, where necessary, to readjust the balancing of the cells at any operating time of the battery, during electric charging and discharging, for electromobility and stationary applications.

More specifically, a method is disclosed for controlling a battery with electrochemical cells, the method allowing the average currents passing through the cells to be balanced, wherein the battery comprises at least one current line formed by a plurality n of basic cell modules connected in series, capable of delivering a voltage waveform, each basic module comprising two connection terminals, at least one cell delivering a basic voltage Vcell, and switching means capable of controlling the basic module in the current line as a function of three different control states allowing respectively said basic voltage Vcell, a zero voltage and said inverted voltage Vcell to be delivered to said terminals so as to produce a voltage waveform, the method comprising a step of controlling control signals of the basic modules so as to supply the voltage waveform on the basis of a selection of a group of q basic modules as a function of a reference voltage setpoint Vref, where Vref=qVcell. The method further comprises:

determining a classification of the n basic modules;

processing of the classification of the plurality n of basic modules according to a circular permutation of the positions of the basic modules such that each basic module of the plurality n of basic modules is involved in producing the voltage waveform.

According to an alternative embodiment, processing of the classification according to the circular permutation is executed in the event that the reference voltage setpoint Vref is also detected as being below a predetermined voltage threshold and in the event of the simultaneous detection of a current setpoint of the current line that is above a predetermined current threshold.

According to an alternative embodiment, the circular permutation is executed at a permutation frequency that is greater than the frequency of the reference voltage setpoint.

According to an alternative embodiment, the method further comprises determining the state of charge of each basic module of the plurality n of basic modules and determining the classification according to an order depending on the state of charge of each basic module, and wherein processing of the classification according to the circular permutation is executed only if a difference is detected in the state of charge of each basic module of the plurality n of basic modules, in relation to the other basic modules, as being below a minimum predetermined threshold.

According to an alternative embodiment, the method further comprises, if a difference is detected in the state of charge of at least one basic module of the plurality n of basic modules, in relation to the other basic modules, as being above a predetermined maximum threshold, stopping processing of the circular permutation classification.

According to an alternative embodiment, the step of determining the classification is triggered in accordance with a period, the value of which is dependent on the discharging and charging rate of the battery over a predetermined duration.

According to an alternative embodiment, the method further comprises, if the remaining capacity of the battery is detected as being below a minimum predetermined threshold, stopping processing of the classification according to the circular permutation.

According to an alternative embodiment of the method, if processing of the classification according to the circular permutation is detected as being stopped, the control step involves connecting the cells of said group of q basic modules having the highest state of charge in the classification to the current line in the event of the detection of a discharging line current, and connecting the cells of said group of q basic modules having the lowest state of charge in the classification in the event of the detection of a charging line current.

According to an alternative embodiment, the control step comprises the following sub-steps:

when the current of the current line and the reference voltage setpoint Vref have the same sign, controlling the basic modules so as to connect the cells of the basic modules for which the position nk ranges between 1 and q to the current line;

when the current of the current line and the reference voltage setpoint Vref have opposite signs, controlling the basic modules so as to connect the cells of the basic modules for which the position nk ranges between nq and n to the current line.

According to an alternative embodiment, the determination of the state of charge of each basic module is triggered at a switching time of the control state of each of said basic modules and said determination involves estimating the variation in the state of charge of each of said modules between a first and a second switching time on the basis of the control state of each of said modules between the first and the second switching time and the value of the average current of the current line.

According to an alternative embodiment, the method comprises a diagnostic step, for example, calibration of the state of charge value of a basic module, comprising the following successive sub-steps:

in the event of the detection of a diagnostic request, assigning an exclusion position in the classification to said basic module so as to exclude said basic module from said group of q modules during a predetermined exclusion period;

executing the diagnostic of the basic module during the exclusion period.

Also disclosed is a control unit of an electrochemical battery comprising at least one current line, formed by a plurality n of basic cell modules connected in series, capable of delivering a voltage waveform, each basic module comprising two connection terminals, at least one cell delivering a basic voltage Vcell and a switching means capable of controlling the basic module in the current line as a function of three different control states allowing respectively said basic voltage Vcell, a zero voltage and said inverted voltage Vcell to be delivered to said terminals so as to produce the voltage waveform. The control unit is configured to implement the method for controlling balancing of the average currents passing through the cells according to any one of the preceding embodiments.

An electrochemical battery system is disclosed comprising said control unit.

Also disclosed is motor vehicle comprising an electric traction module and said battery system electrically connected to the traction module.

Additionally, a stationary electrical energy storage unit comprising said battery system is disclosed.

Further a computer-program is disclosed comprising instructions, which, when the program is executed by a control unit of the battery system, cause said system to implement any one of the embodiments of the control method for balancing the average currents passing through the cells.

Controlling the voltage wave on the current line according to the method controls a homogenous average charging and discharging current over all the cells of the battery and also allows, when a state of imbalance is detected, dynamic balancing of the cells to be implemented individually when operating the battery for charging and discharging during acceleration phases, during regenerative braking phases and during the charging and discharging phase on the electrical mains when the vehicle is connected to an external charging terminal. The method is also applicable to fixed stations connected to the electrical network or operating in island mode, i.e. disconnected from the electrical distribution network.

In addition, balancing is carried out under the action of the battery charging and discharging current, which improves the balancing dynamics in relation to passive and active balancing solutions, while avoiding Joule effect losses and reducing yield losses.

Furthermore, the electrical architecture of the battery with integrated inverters allows cells with different capacities to co-exist in the battery, allows switching losses to be reduced, allows common mode currents in an electric machine to be reduced, allows leakage currents to be eliminated that are generated in conventional architectures of degradation mechanisms of bearings and gears by corrosion ("pitting"), allows degraded operation to be controlled without immobilizing the vehicle and allows a full-wave control to be controlled, which results in fewer degradations in the machine windings. The architecture also has high efficiency at low power and partial power compared to a conventional structure, with charging directly connected to a single-phase and three-phase network with dynamic cell balancing and dynamic balancing carried out in hidden time. There is therefore no longer any need for life phases linked to the static balancing of the cells, generally carried out at the end of battery charging.

DESCRIPTION OF THE FIGURES

Further features and advantages of the present method and system will appear more clearly upon reading the following detailed description of embodiments of the method and system, which are provided by way of non-limiting examples and are illustrated by the appended drawings, in which:

FIG. 1 schematically shows a battery system comprising an integrated inverter architecture allowing individual control of an electric cell capable of implementing the control method;

FIG. 2 shows an example of a voltage waveform that can be generated by the battery system, in particular for supplying an electric machine with a sinusoidal alternating voltage;

FIG. 3 schematically shows a functional module of the battery system control unit, the function of which is to ensure balancing of the cells in the battery charging and discharging situation;

FIG. 4 shows an embodiment of a battery control algorithm for implementing the balancing of the cells of a current line and maintaining this state of equilibrium using the control method;

FIG. 5 is a graph showing the instantaneous current experienced by a cell of a basic module when implementing the balancing control method;

FIG. 6 is a graph showing the instantaneous current experienced by a cell of a basic module when processing the circular permutation cycling is activated;

FIG. 7 shows an example of an electric traction powertrain system for a motor vehicle comprising an integrated inverter battery system, and more specifically the control chain of the battery system implementing the method; and FIG. 8 shows an example of an electrical energy storage station system for a high-voltage network comprising an integrated inverter battery system, and more specifically the control chain of the battery system implementing the method.

DETAILED DESCRIPTION

The invention applies to battery systems formed by electrochemical cells, for example, of the lithium-ion type, where each cell can be controlled individually according to the architecture proposed by the Applicant in International Patent Applications WO2018193173A1 and WO2018154206A1 mentioned above. This architecture is capable of generating complex output voltages that can assume the form of several types of voltages without needing an additional voltage converter outside the battery system, for example, a sinusoidal alternating voltage electrically connected to an asynchronous or synchronous electric machine, or to a single-phase or three-phase electrical network, or even a constant voltage electrically connected to a direct current electric machine, a DC/DC type voltage converter or a charging interface.

FIG. 1 schematically shows an embodiment of the battery system configured to apply the proposed control method. The battery system comprises a battery module BAT having at least one current line LT1 and a control unit UMI, the function of which is at least to control the voltage waveform of the line LT1 as a function of a setpoint reference Vref. According to the embodiment of FIG. 1, the battery BAT comprises three current lines LT1, LT2, LT3 capable of producing three three-phase voltages shifted by $2\pi/3$. The control of each current line is similar, differing only by a shift of $2\pi/3$ between them. The purpose of the control method is to allow balancing of the electric cells of the same current line LT1, LT2 or LT3.

As a person skilled in the art knows, a basic electric cell of a battery is an electrical energy accumulator having two terminals, a positive electrode and a negative electrode, and having a voltage of a few volts, most often ranging between 2V and 4V, generally approximately 2.2V or 3.7V. More specifically, a Lithium-ion cell is also made up of a separator, an electrolyte and current collectors deposited on the electrodes. The operating principle of a Lithium-ion cell is based on the reversible exchange of lithium ions between the two electrodes. During discharging, the cell supplies electrical energy, the lithium ions separate from the negative electrode, while releasing an electron, then migrate and are conveyed through the electrolyte towards the positive electrode. The electrons produced at the negative electrode and consumed at the positive electrode circulate through a circuit outside the cell and generate an electric current, which will supply the loads connected to the terminals of the cell. The process is reversed when charging. The control method applies to other technologies, such as cells of the lithium polymer, nickel-cadmium or nickel-metal-hydride type.

A battery system (or pack) is formed by a plurality of basic cells arranged so as to have, at the terminals of a current line, a voltage that is higher than that of a basic cell. The battery system BAT according to FIG. 1 has a voltage of several hundred volts, preferably 250V or more, at its terminals, but can, depending on the electrical requirements, have only several tens of volts (24V, 36V, 48V, for example), and particularly addresses applications for electrically powering traction electric machines for vehicles, in particular a motor vehicle equipped with an asynchronous, synchronous or direct current electric machine, but also for fixed energy storage stations for the high voltage electrical network.

In the case of a vehicle powertrain, the output of each current line is intended to be directly connected (without a voltage converter) to the current line of one or more electric machine(s), and to the current line of a vehicle charging interface that can operate at a constant voltage or an alternating voltage.

The battery system BAT further comprises a plurality n of basic modules ME1, MEk-1, MEk, MEn of electric cells, said modules being mounted in series between two terminals B1, B2 in order to form each current line LT1, LT2, LT3. The n basic modules are referenced using an index k, where k is a natural integer between 1 and n. For example, n can be equal to 80 in order to form a line voltage that can reach an average peak value of approximately 290V on each current line LT1, LT2, LT3, or a lower voltage, for example, approximately 240V from a group q of basic modules, where q is less than n. For the sake of simplification, a single basic module is shown in detail.

More specifically, each basic module MEk comprises two connection terminals Bk1, Bk2, with at least one basic electric cell CEk delivering a basic voltage Vcell connected between said terminals, a switching means comk1, comk2 capable of configuring the basic module MEk in three different states, respectively, delivering said basic voltage Vcell, a zero voltage and said inverted voltage Vcell to said connection terminals Bk1, Bk2. Each basic module MEk comprises a single basic cell.

As an alternative embodiment, two or more basic cells are electrically connected inside the same basic module, directly and permanently in parallel and/or in series with each other. In this way, such a group of basic cells has two connection terminals electrically connected to the switching means comk1, comk2 so as to deliver the voltage to the terminals of the group of basic cells, and so as to deliver a zero voltage and said inverted voltage to the connection terminals Bk1, Bk2 of the basic module. In the event that several basic cells are connected in series in a single basic module MEk, this basic module also comprises a means for conventionally balancing said in series cells of said basic module.

The switching means is, for example, formed by two basic switching modules comk1, comk2 forming an H-bridge that can be controlled in the three different states by a control signal uik from the control unit UMI of the battery BAT, performing the "DRIVER" function. The states are shown by a control variable uik that can assume, for example, the values 1, 0, -1 representing the three different states respectively controlling said basic voltage Vcell, a zero voltage and said inverted voltage -Vcell at said connection terminals Bk1, Bk2 of the basic module, indexed k. As illustrated in FIG. 1, each basic switching module comprises two electronic components, such as power transistors, optionally of the MOSFET or HEMT (High Electron Mobility Transistor) type, controlled by the signals ui1 to uin of the control unit UMI. Thus, the voltage vik at the terminals Bk1, Bk2 of each basic module MEk can be controlled as a function of the control signal uik according to the following relation:

$$u_{ik} = \begin{cases} 1, & v_{ik} = V_{Cell} \\ 0, & v_{ik} = 0 \quad k = 1 \ldots n \\ -1, & v_{ik} = -V_{Cell} \end{cases} \quad \text{Equation 1}$$

FIG. 2 shows an example of a voltage waveform that can be delivered by the battery BAT on the current line LT1. In this non-limiting example, the reference voltage setpoint Vref is sinusoidal and the voltage phase VM1 of the current line LT1 is formed by amplitude stages that are equal to the basic voltage Vcell. Any voltage waveform can be controlled by the control unit, for example, sinusoidal with a frequency of 50 Hz or a constant voltage, for example.

The functional means of the control unit UMI will now be described that allows the control method to be implemented to ensure the balancing of the state of charge of the cells of the same current line. This implementation can occur by means of the control unit UMI of the battery BAT, which can be integrated in or formed by the battery management computer BMS (Battery Management System) in a decentralized architecture, as illustrated in a non-limiting manner in FIG. 1. However, this is not compulsory. Indeed, the method could be established in a module outside the BMS, for example, within a basic module MEk according to a decentralized architecture, while being coupled thereto. In this latter case, the external module itself can be arranged in the form of a dedicated computer comprising an optional dedicated program. Consequently, the module for implementing the battery control method can be produced in the form of software (or computer) modules, or even of electronic circuits (or "hardware"), or even of a combination of electronic circuits and software modules.

FIG. 3 more specifically shows a functional module of the control unit UMI of the battery BAT, the function of which is to control the control signals uik of each basic module MEk.

The control unit UMI is capable of receiving a reference voltage setpoint Vref and a current value Ia of the current line (a setpoint or a measurement) as an input parameter. In response to the voltage setpoint Vref, a line current is generated that passes through each basic module connected to the current line. The line current can be a charging current and a discharging current (with an active and/or reactive component). In the case of an alternating reference voltage, the line current can be in phase with or out of phase with the reference voltage by a phase shift value ranging between -90° and 90° depending on the electrical behavior (resisto-inductive) of the electrical network (mains or on-board network of the vehicle) connected to the, or each, current line of the battery.

A first module 11 at each instant is capable of determining the number q of basic modules that is necessary from among the plurality n of basic modules in order to produce the voltage waveform for each quantized voltage phase ViM demanded by the setpoint Vref and where all the basic cells have the same basic voltage Vcell as a function of the following relation:

$$V_{iM} = V_{Cell} \cdot \sum_{k=1}^{q} u_{ik} \text{ with } \sum_{k=1}^{n} u_{ik} = q \quad \text{Equation 2}$$

A second module 12 is capable of assigning to each basic module MEk a position nk in a classification 13 (table, list or index) stored in the memory of the control unit UMI. This classification 13 is dynamic and can be modified by the control unit UMI and stores the position nk of each of the basic modules MEk at any time. Thus, by virtue of the dynamic classification it is possible to obtain the same voltage from different control combinations uik of the basic modules.

The aim is to modify this classification 13 when producing a voltage wave of a current line while charging and discharging the battery, so as to maintain the balancing of the state of charge of the cells.

To this end, the control unit comprises a module 16, the function of which is to process the classification of the plurality n of basic modules according to a circular permutation of the positions nk of the basic modules MEk, such that each basic module of the plurality n of basic modules is involved in producing the voltage waveform. The permutation involves shifting the position of the basic modules in the classification. Due to the fact that the number q of basic modules needed to produce the waveform is less than the total number n of available basic modules, at any time some basic modules are shunted while others are passed through by the line current. Classification cycling implements an action involving chopping the current passing through each non-shunted cell. Cycling is particularly beneficial when the cells have reached a mutual state of charge balance over a given period in order to equalize the average currents passing through them over a period of the reference voltage. Similarly, cycling allows the impact of high current demands to be reduced and, when few cells are demanded (low q compared to n), allows the voltage waveform to be produced, in particular when a motor vehicle is going uphill. This thus avoids accentuating any imbalance that already exists.

In all cases, the module 16 is carefully activated when q is less than n for forming a voltage wave likely to be generated over a significant duration, namely several tens of minutes, or even several hours.

Thus, triggering of the cycling by the module 16 according to the circular permutation can be dependent on a difference in the state of charge between the basic modules MEk in relation to a predetermined threshold, or even according to a current setpoint value in relation to the value of the requested voltage level.

More specifically, the module 16 modifies the classification table 13 according to the following algorithmic relation:

$$n_k \leftarrow (n_k+1) \bmod n \qquad \text{Equation 3}$$

The positions nk in the total list of the n basic modules are cycled when q is less than n and at permutation frequencies above the frequency of the signal Vref, for example, approximately 1 kHz for a reference voltage Vref of frequency 50 Hz. The ratio between the permutation frequency and the frequency of the voltage signal can be different and will be selected as a function of the switching joule losses in relation to the drop in internal impedance of the battery. The permutation frequency is configured to ensure the complete permutation of the n modules over a predetermined duration, i.e. each module has been successively positioned in the classification at each of the positions over said duration. The predetermined duration is equal to or less than the period of the electrical voltage of the current line.

It has been observed that cycling allows the internal impedance value of an electric cell to be reduced, by the order of approximately 30% for a cell using Lithium Iron Phosphate technology. It is thus possible to adapt the switching frequency to the technology of the selected cells. Thus, as an alternative embodiment, the permutation frequency of the circular permutation can be dependent on the value of the internal impedance of the cell of each basic module.

Furthermore, another aim of the control unit is to carry out dynamic balancing of the cells before, at the same time or after cycling the cells according to the circular permutation. When the cells of a current line are imbalanced, or to guarantee a balancing level before implementing the cycling, the control unit UMI comprises means for implementing balancing of the cells.

To this end, the position nk of each basic module MEk is preferably dependent on the state of charge SOC level of each basic module in order to allow the cells to be balanced at any time of battery operation. However, this does not rule out the possibility that the classification is obtained on the basis of a value representing the state of aging of a cell, or, more generally, of any parameter representing an operating state specific to a cell defining the intervention of a cell for forming a voltage wave.

In a preferred embodiment, the purpose of the classification 13 is to record a list of basic modules in ascending or descending order of the state of charge SOC. For the descending order classification, for the basic module MEk having the highest state of charge, the module 12 assigns the position nk=1, and so on until the position nk=n is reached for the basic module having the lowest state of charge.

In addition, each basic module MEk can be individually controlled by a module 14 in said three different states (+1, 0, −1), and, in accordance with the method, the module 14 is configured to control the basic modules so as to connect a group of q basic modules MEk to the line current that have the highest state of charge SOC in the classification 13 if a discharging current passing through the current line LT1 is detected, and to connect said group of q basic modules MEk that have the lowest state of charge in the classification if a charging current passing through the current line LT1 is detected. The q modules have successive positions in the classification 13.

By convention, the following notions are defined:

The line current is a discharge current when the current and the voltage have the same sign, i.e. at a given instant the reference voltage and the line current both have a positive sign or a negative sign.

The line current is a charging current when the current and the voltage have an opposite sign, i.e. at a given instant, the reference voltage has a positive sign and the line current is negative, or the reference voltage has a negative sign and the line current is positive.

A line current is positive when the current is outgoing toward the electrical circuit and the line current is negative when the current is incoming toward the battery.

The sign of the voltage is referenced in relation to the terminals B1, B2 of the current line of the battery, where terminal B1 is connected to a phase terminal of the electrical circuit (electric machine winding terminal or electrical network phase terminal) and terminal B2 is connected to a neutral terminal. In the case of a direct voltage circuit, terminal B1 is the positive terminal and terminal B2 is the negative or ground terminal of the battery.

This mode of controlling the voltage wave on the current line allows dynamic balancing of the cells to be implemented individually when the battery is operating by controlling a charging and discharging current passing through the current line. In addition, the balancing is carried out under the action of the charging and discharging current of the battery that is of the order of several tens of amperes, or even several hundred amperes, which improves the balancing dynamics in relation to the known solutions of passive and active balancing where the balancing currents are only a few amperes, which exhibit Joule effect losses and therefore yield losses. The charging/discharging current is a current passing through the current line of the battery when said battery is connected to the electrical network of the vehicle or the mains.

According to an alternative embodiment for controlling the battery, the module 14 is configured such that the classification involves assigning a position nk to each basic module MEk ranging between 1 and n in a list in descending state of charge order, and at each instant the step of controlling the basic modules comprises the following substeps:

determining the line current Ia of the current line LT1;

when the line current Ia and the reference voltage setpoint Vref have the same sign, controlling the basic modules MEk so as to connect the basic modules Mek to the current line for which the position nk ranges between 1 and q;

when the line current and the reference voltage setpoint have an opposite sign, controlling the basic modules MEk so as to connect the basic modules to the current line for which the position nk ranges between nq and n.

It should be noted that, at each instant, the control unit UMI connects q cells (q≤n), where q is the ratio between the reference voltage Vref desired at this instant at the line output and the basic cell voltage Vcell.

Thus, the state of each control variable of the basic modules can be controlled by the module 14 according to the following algorithmic relation, where the classification is indexed in decreasing state of charge order:

$$\text{if sign } (V_{ref}, (t)) == \text{sign } (i_i(t)) \quad u_{ik} = \begin{cases} 1 & \text{if } V_{ref\_i}(t) > n_k \cdot V_{Cell} \\ -1 & \text{if } V_{ref\_i}(t) < -n_k \cdot V_{Cell} \\ 0 & \text{otherwise} \end{cases} \quad \text{Equation 4}$$

$$\text{otherwise} \quad u_{ik} = \begin{cases} 1 & \text{if } V_{ref\_i}(t) > (n - n_k) \cdot V_{Cell} \\ -1 & \text{if } V_{ref\_i}(t) < -(n - n_k) \cdot V_{Cell} \\ 0 & \text{otherwise} \end{cases}$$

where nk is the position of each module in the classification, Vcell is the basic voltage of a cell and $V_{ref\text{-}i}$ and $i_i$ are the reference voltage setpoint and the line current (ampere) of each current line referenced i, where i ranges, for example, between 1 and 3 for each current line of a three-phase voltage, respectively.

A person skilled in the art will of course be able to configure the classification in increasing state of charge order and consequently modify the algorithmic relation allowing each basic module MEk to be controlled.

Furthermore, it is possible for the module 12 to be capable of assigning a position nk as a function, in addition to the state of charge SOC, of a criterion that is dependent on the state of aging of each basic module or on the residual capacity of each basic module. For example, for modules with an equivalent state of charge, it is possible to implement the classification by taking into account the state of aging in order to activate, by priority, the younger modules or those with a higher total residual capacity compared to the modules exhibiting more advanced fatigue.

Furthermore, a module 15 is capable of determining the state of charge SOCk of each basic module MEk at any instant. The state of charge SOCk corresponds to an electrical capacity contained in the cell of a basic module MEk, expressed in A/s, A/h (Ampere per second or Ampere per hour), or even normally as a charge percentage in relation to a real total capacity at a time t.

Determining the state of charge SOCk is computed by a first coulometric method. As is well known to a person skilled in the art, estimating using coulometric measurement is carried out on the basis of an initial known reference state of charge, for example, a complete state of charge corresponding to 100% of the SOC for a total capacity that is known at the time of evaluation for a known state of aging, and on the basis of the variation in charge measured by a current sensor of the current line. The algorithms for evaluating the state of health of an electrochemical cell are well known to a person skilled in the art and can be implemented by the control unit of the battery system BAT.

Advantageously, the module 14 is configured to determine the state of charge SOC of each basic module MEk at a switching time of the control state of each basic module. To this end, the module 14 estimates the variation in the state of charge of each module MEk between a first and a second switching time on the basis of the control state uik of each module MEk and the value of the average current of the current line. By virtue of this method, the battery thus does not need to be fitted with one current sensor for each cell. The control logic variable uik is known at all times and thus allows, solely on the basis of the measurement of the line current, the state of charge to be estimated by an integration computation over the period between the two switching times. This period can be fixed or variable. Control state switching is understood to mean the control command corresponding to the refreshing of the control state of a basic module MEk and covers the situation involving changing from a first control state from among the states +1, 0, −1 to a second different state from among these same states or, from a control state from among the states +1, 0, −1 to this same state.

This first coulometric method nevertheless has a disadvantage, since over time it is likely to lead to an error in the estimation of the SOC that increases as the computations progress. Therefore, provision is also made for the control unit UMI to comprise a module 18 capable of executing a readjustment or calibration of the estimate of the state of charge of each cell of the basic modules, or even any other type of diagnosis, such as, for example, an assessment of the state of aging.

According to an alternative embodiment involving calibrating the state of charge when precision is no longer guaranteed by the coulometric method, the module 18 is capable of estimating the no-load voltage of a cell during a relaxation phase of the cell (principle based on Kalman filters or optionally tabulated values). No-load voltage estimation techniques are well known to a person skilled in the art and are not specifically the subject matter of the invention. It is known that some methods require several tens of minutes in order to perceive the stabilization of the voltage at rest and obtain a reliable value of the no-load voltage and therefore of its state of charge SOC. Other modeling methods can be executed in less time, but require greater computational resources.

Irrespective of the method for estimating no-load voltage, the control unit UMI comprises a module 17 configured to assign, at any time, to each basic module MEk, an exclusion position in the classification 13 so as to exclude said basic module from said group of q basic modules during a predetermined exclusion duration. Thus, by virtue of the module 17, it is possible to temporarily bypass an electric cell individually, independently of the value of its state of charge, in order to implement a diagnosis or calibration in masked time, without affecting the normal operation of the battery. It is possible to contemplate that the action of excluding the module 17 can be triggered for any type of diagnosis requiring deactivation of the affected basic module, whether this involves the calibration of the state of charge or the evaluation of the state of aging of a cell, for example.

It should be noted that the duration of exclusion is dependent on the duration needed to implement the diagnosis. Once the exclusion position has been assigned, with nk being greater than q for discharging and nk being less than nq for charging, the module 18 is authorized to execute the method for evaluating the no-load voltage for the associated basic module. It should be noted that the action of the module 17 is a function of the state of a flag or indicator that activates when the precision of the state of charge is not guaranteed by the control unit. The indicator is activated, for example, high state, to request a readjustment of the SOC. The indicator deactivates, low state, when the recalibration is performed.

It is worth adding that the classification 13 of the basic modules in state of charge order is active at any time the battery operates, for charging, for discharging, so as to ensure that the cells of a current line are balanced without a dedicated monitoring protocol. The frequency of the classification of the state of charge order is configured as a function of a predetermined duration or as a function of the battery discharging/charging rate, for example, in a range between 1 second and 5 minutes, or for a variation of a predetermined proportion of the total capacity of the battery, for example, every 1% of discharged/charged SOC (i.e. every hundredth of the capacity in relation to the total capacity of the battery).

FIG. 4 shows an algorithm block diagram (or flow chart) of an embodiment of the method for controlling a battery allowing the cells of a current line to be balanced and the balancing to be maintained. The balancing steps of the method are preferably implemented before the cycling processing, so as to provide an initial balancing state. However, this sequence is not compulsory and the cycling, relating to step 36, can be activated as soon as the control unit detects a sufficient state of balancing of the cells, for example, a difference in the state of charge between the cells that is below a predetermined threshold.

Preferably, the method firstly comprises the following steps for balancing the cells:
a step 31 of determining the state of charge of each basic module MEk of the plurality n;
then a step 32 of determining a classification of the n basic modules according to an order depending on the state of charge of each basic module; and
then a step 33 of controlling the control signals of the basic modules MEk so as to provide, at any time t, the voltage waveform of the current line on the basis of a selection of a group of q basic modules as a function of the reference voltage setpoint Vref, where Vref=qVcell.

The determination step 31 is not limited to the state of charge of a cell. It should be noted that the classification 13 can be obtained on the basis of the value of any operating parameter that is specific to a cell, for example, the state of aging, the residual capacity or even by the electrical position in the current line.

More specifically, according to a preferred alternative embodiment of the method, this control step 33 involves connecting said group of q basic modules to the current line, which group is successive in the classification, having the highest state of charge in the classification if a discharging line current is detected, and involves connecting said group of q basic modules having the lowest state of charge in the classification if a charging line current is detected.

This step is executed when the battery is in the charging and discharging operating phase under the action of the charging and discharging current, thus ensuring better balancing dynamics than the passive and active solutions described in the prior art. The line current and the voltage setpoint are sinusoidal alternating signals assuming positive and negative values over a period. The method thus preserves the balance of the cells at any time a vehicle operates due to the consideration of the direction of the current for detecting the charging and discharging phases over at least one phase period, in particular during the series of acceleration and regenerative braking phases. Controlling balancing is, of course, similarly applicable for a vehicle battery connected to an electrical network via the charging terminal or for a stationary application, in particular in the case of a control process called "Smart Grid" for managing a network where charging and discharging phases are controlled.

Thus, over a period of the reference voltage, a basic module that is highly charged compared to the other modules (for example, nk=1) will be subjected to a discharging current only, whereas a module with a low charge compared to the other modules (for example, nk=n) will be subjected to a charging current only.

To illustrate this example, FIG. 5 shows the instantaneous current Ia of a cell of a basic module at position nk=10 during the execution of the control method for an example of a battery architecture. The ordinate axis shows the value of the charging current in amperes and the abscissa axis shows the time tin milliseconds.

In this example, the current line is equipped with 80 basic modules mounted in series, the unit voltage Vcell is equal to 3.3V, the sinusoidal reference voltage has an amplitude of 264V and the sinusoidal current is equal to 100 A. The voltage and the current have a phase shift of 45° considering the inductive behavior of the machine windings and its operating point. As can be seen in this figure, the current observed in the cell is partially sinusoidal and remains positive over the same period, since the cell of the basic module is connected to the line only when the line current is a discharging current. Indeed, its relatively low position in the list (high state of charge) exposes it to discharging currents only. It should be noted that the current observed in a basic module therefore depends on the state of charge value of the cell of the basic module, and on the phase shift between the voltage setpoint and the line current. In the event of zero phase shift, the current will have a continuous value without interruptions.

Then, according to the method, in the event of detection, in a step 34, of the activation of a condition for reordering the classification, with a duration since the previous ordering that is greater than a predetermined duration, or optionally a variation in the state of charge since the previous ordering that is greater than a predetermined threshold, steps 31 and 32 are executed again. The predetermined duration can range between one or several minutes, for example, in order to reduce the energy losses linked to the switching actions of the transistors.

According to an alternative embodiment of the method, shown in FIG. 4, the classification step 32 involves, in a sub-step 320, assigning a position nk to each basic module ranging between 1 and n in a list in decreasing state of charge order and the control step 33 comprises the following successive sub-steps:

determining, at a step 330, the sign of the current of the current line in order to then compare, in a step 331, the sign of the current and the sign of the reference voltage in order to detect whether the line has a charging or discharging current;

controlling, at a step 332, when the current and the reference voltage setpoint have the same sign (i.e. discharging current), the basic modules so as to connect the basic modules for which the position nk ranges between 1 and q to the current line;

controlling, at a step 333, when the current and the reference voltage setpoint have an opposite sign (i.e. charging current), the basic modules so as to connect the basic modules for which the position nk ranges between nq and n to the current line.

It is also contemplated that the classification in state of charge order carried out by the module 12 can be deactivated if the control unit UMI detects that the cells are balanced, i.e. that the difference in the state of charge between each cell is below a predetermined minimum threshold.

It should be noted that the steps 31, 32, 33, 34 of the control method are not compulsory. The cells can be balanced by means of any type of balancing method, in particular by a passive or active method as described in the prior art.

In a step 35, in accordance with the control method, if the control unit detects that the cells are balanced, the module 16 is activated in order to implement, in a step 36, the circular permutation of the classification such that each basic module of the plurality n of basic modules is involved in producing the voltage waveform. The circular permutation guarantees the same average current demand for all the cells over a period of the reference voltage. The permutation is executed when q is less than n. The circular permutation is active as long as the cells are balanced and is carried out at a permutation frequency that is greater than the frequency of the reference voltage setpoint Vref, for example, 1 kHz for a reference voltage of 50 Hz.

As an alternative embodiment of step 35, the module 16 is activated if the reference voltage setpoint is also detected as being lower than a predetermined voltage threshold and if a current setpoint is simultaneously detected as being higher than a predetermined threshold current. This strategy aims to specifically respond to high current demands when a small number of cells is called upon to produce the voltage waveform. This activation aims to prevent an imbalance in the cells.

The classification 32 into state of charge order can be activated at the same time as the circular permutation processing 36, or one or the other only during a given period.

FIG. 6 shows a graph illustrating the instantaneous current Ia of a cell of a basic module at position nk=10 when executing the cycling for an example of a battery architecture. The ordinate axis shows the value of the charging current in amperes and the abscissa axis shows the time tin milliseconds.

In this example, in the same way as in the example of FIG. 5, the current line is equipped with 80 basic modules mounted in series, the unitary voltage Vcell is equal to 3.3V, the sinusoidal reference voltage has an amplitude of 264V and the sinusoidal current is equal to 100 A. The voltage and the current have a phase shift of 45° considering the inductive behavior of the machine windings and its operating point.

As can be seen in this figure, the current observed in the cell is partially sinusoidal since said cell is activated when the level of the reference voltage is more than ten times the basic voltage Vcell as an absolute value. A chopping of the current can be seen that results from the cycled positioning of the cell in positions of the classification that are not requested (position controlling a shunted state) when generating the voltage wave. Circular permutation cycling according to the total number of cells allows any thermal losses to be minimized, the internal resistance of each cell to be reduced and the value of the average current of all the cells to be equalized during the cycling period.

Finally, in step 35 of the method, if an imbalance in the state of charge is detected and a request to deactivate the circular permutation is made, the method returns to step 31 in order to balance the cells. This situation is detected when a difference in the state of charge between at least one of the cells of the other cells is greater than a predetermined maximum threshold.

In an alternative embodiment, when the remaining capacity of the battery (or residual autonomy of the vehicle, for example) is below a predetermined threshold, the classification in the state of charge order is activated. In this case, the classification in the state of charge order and the associated balancing control is kept active until the remaining capacity of the battery reaches a minimum limit, for example, less than 10% or a few percent of the total capacity or even zero capacity. In this way, all the cells reach the minimum authorized state of charge at the same time.

In addition, as previously mentioned, the classification allows temporary shunting of one or more cells for the purposes of diagnosing or calibrating the state of charge, while maintaining the normal operation of the battery system. FIG. 4 also shows the progress of these steps 40, 41, 42, where:

In the event of detection 40 of a diagnostic request (calibration of state of charge, for example), the method comprises a step 41 of assigning an exclusion position in the classification to a basic module so as to exclude said basic module from said group of q modules for a predetermined exclusion duration, then comprises a step 42 of executing said diagnosis of the basic module for the exclusion period.

FIG. 7 shows a first application of the control method in the field of electromobility for a motor vehicle powertrain comprising a battery system in accordance with the architecture with integrated inverters as described in FIG. 1. The vehicle can be a hybrid or electric vehicle fitted with one or more electric traction machines (asynchronous, synchronous or direct current) where the machine, or each machine, is electrically connected to the battery system. The powertrain 500 comprises a module 50 for generating a current setpoint 51 sent to a current servo loop. The generation module 50 delivers a current setpoint as a function of a torque demand originating from the accelerator pedal of the vehicle or from an automatic control module, such as an automatic speed regulation function on the basis of a speed and torque measurement of the set of drive wheels. Conventionally, the current servo loop receives said setpoint 51 and the measurement 58 of the current generated on at least one of the current lines of the battery 56. The battery 56 is directly electrically connected (without an electrically interposed voltage converter) to at least one electric traction machine 57 driving a wheel set 59 of the vehicle, as well as to a charging interface (not shown) on an electrical network outside the vehicle, in this example, with three-phase voltage. The battery architecture does not require the use of an inverter at the battery line output.

The servo loop further comprises a corrector 52 delivering a reference voltage setpoint 53, as a function of the setpoint 51 and the measurement 58, to a control unit 54 of the battery 56. The control unit 54 delivers control setpoints 55 controlling each basic module of the battery in accordance with the control method described above as a function of the voltage setpoint in order to maintain the balance of the cells of the battery, by virtue of the cycling of the cells.

FIG. 8 shows a second application of the control method in the field of stationary batteries where a battery system in accordance with the architecture with integrated inverters as described in FIG. 1 is connected to the electrical network (high voltage, very high voltage). The battery system 600 receives a power setpoint 60, resulting from demands for active power (P) and reactive power (Q) to be injected into the electrical network 70. The system further comprises a module 61 for determining the current setpoint 62 by amplitude and phase as a function of the setpoint 60 and a measurement of the voltage 69 on the current line at the output of the battery 67, and a current servo loop comprising a corrector 63 delivering a reference voltage setpoint 64 as a function of a current measurement 68 on a current line (in this case three-phase) at the output of the battery 67 and of the current setpoint 62. The control unit 65 of the battery 67 delivers control setpoints for each basic module of the battery in accordance with the control method described above as a function of the reference voltage setpoint in order to maintain the balance of the cells by virtue of the cycling of the cells.

In this type of application, the system 600 can be controlled in order to charge and discharge the battery from the electrical network.

The following different technical advantages of the control method are summarized hereafter:
- dynamic balancing of the cells during the life phases of the vehicle: traction, charging and discharging on the mains electricity network;
- balancing of cells that can have different states of aging;
- balancing of cells with different capacities;
- dynamic balancing without using a specific balancing device but by reusing the local inverters of each basic module;
- high balancing efficiency (>90%);
- balancing current equal to the battery cycling current (charging and discharging current of the battery during operation).

The invention claimed is:

1. A method for controlling a battery having electrochemical cells, the method allowing average currents passing through the cells to be balanced, the battery comprising at least one current line formed by a plurality n of basic cell modules connected in series, capable of delivering a voltage waveform, each basic cell module comprising two connection terminals, at least one cell delivering a basic voltage Vcell, and switching means capable of controlling the basic cell module in the current line as a function of three different control states allowing said basic voltage Vcell, a zero voltage and said inverted voltage Vcell to be delivered to said terminals so as to produce a voltage waveform, the method comprising a step of controlling control signals of the basic cell modules so as to supply the voltage waveform on the basis of a selection of a group of q basic cell modules as a function of a reference voltage setpoint Vref, where Vref=qVcell, the method further comprising:
determining a classification of the n basic cell modules;
processing the classification of the plurality n of basic cell modules according to a circular permutation of the positions of the basic cell modules such that each basic cell module of the plurality n of basic cell modules is involved in producing the voltage waveform.

2. The method according to claim 1, wherein processing the classification according to the circular permutation is executed in the event that the reference voltage setpoint Vref is also detected as being below a predetermined voltage threshold and in the event of the simultaneous detection of a current setpoint of the current line that is above a predetermined current threshold.

3. The method according to claim 1, wherein the circular permutation is executed at a permutation frequency that is greater than the frequency of the reference voltage setpoint.

4. The method according to claim 1, wherein the method further comprises:
determining the state of charge of each basic cell module of the plurality n of basic cell modules and determining the classification according to an order depending on the state of charge of each basic cell module;
and wherein processing of the classification according to the circular permutation is executed only if a difference is detected in the state of charge of each basic cell module of the plurality n of basic cell modules, in relation to the other basic cell modules, as being below a minimum predetermined threshold.

5. The method according to claim 4, wherein the step of determining the classification is triggered in accordance with a period, the value of which is dependent on the discharging and charging rate of the battery over a predetermined duration.

6. The method according to claim 4, wherein the method further comprises stopping the processing of the circular permutation classification if a difference is detected in the state of charge of at least one basic cell module of the plurality n of basic cell modules, in relation to the other basic cell modules, as being above a predetermined maximum threshold.

7. The method according to claim 1, wherein the method further comprises stopping the processing of the classification according to the circular permutation if the remaining capacity of the battery is detected as being below a minimum predetermined threshold.

8. The method according to claim 6, wherein, if processing of the classification according to the circular permutation is detected as being stopped, the control step involves connecting the cells of said group of q basic cell modules having the highest state of charge in the classification to the current line in the event of the detection of a discharging line current, and connecting the cells of said group of q basic cell modules having the lowest state of charge in the classification in the event of the detection of a charging line current.

9. The method according to claim 8, wherein the control step comprises the following sub-steps:
when the current of the current line and the reference voltage setpoint Vref have the same sign, controlling the basic cell modules so as to connect the cells of the basic cell modules to the current line for which the position nk ranges between 1 and q;
when the current of the current line and the reference voltage setpoint Vref have opposite signs, controlling the basic cell modules so as to connect the cells of the basic cell modules to the current line for which the position nk ranges between nq and n.

10. A control unit of an electrochemical battery comprising at least one current line, formed by a plurality n of basic cell modules connected in series, capable of delivering a voltage waveform, each basic cell module comprising two connection terminals, at least one cell delivering a basic voltage Vcell and a switching means capable of controlling the basic cell module in the current line as a function of three different control states allowing said basic voltage Vcell, a zero voltage and said inverted voltage Vcell to be delivered to said terminals so as to produce the voltage waveform, wherein the control unit is configured to implement the control method of claim 1.

* * * * *